United States Patent
Krause et al.

(10) Patent No.: US 9,136,518 B2
(45) Date of Patent: Sep. 15, 2015

(54) TERMINAL FOR ACCUMULATOR CELLS

(75) Inventors: Axel Krause, Nesslau (CH); Andrea Meier, Sennwald (CH)

(73) Assignee: BRUSA Elektronik AG, Sennwald (CH)

( * ) Notice: Subject to any disclaimer, the term of this patent is extended or adjusted under 35 U.S.C. 154(b) by 398 days.

(21) Appl. No.: 13/511,139

(22) PCT Filed: Nov. 22, 2010

(86) PCT No.: PCT/IB2010/055343
§ 371 (c)(1),
(2), (4) Date: May 21, 2012

(87) PCT Pub. No.: WO2011/067695
PCT Pub. Date: Jun. 9, 2011

(65) Prior Publication Data
US 2012/0282820 A1    Nov. 8, 2012

Related U.S. Application Data

(60) Provisional application No. 61/267,004, filed on Dec. 4, 2009.

(30) Foreign Application Priority Data

Dec. 4, 2009  (CH) ........................ 1863/09

(51) Int. Cl.
*H01R 13/648*    (2006.01)
*H01M 2/20*    (2006.01)
(Continued)

(52) U.S. Cl.
CPC ............... *H01M 2/20* (2013.01); *H01M 2/206* (2013.01); *H01M 2/266* (2013.01); *H01M 10/0413* (2013.01)

(58) Field of Classification Search
CPC ............................. H01R 4/363; H01R 11/287
USPC .................................. 439/115, 116, 119, 762
See application file for complete search history.

(56) References Cited

U.S. PATENT DOCUMENTS 2,727,220 A * 12/1955 Buchanan et al. ............ 439/812
2,983,897 A    5/1961 Blanchet
(Continued)

FOREIGN PATENT DOCUMENTS

DE    3118947 A1    12/1982
DE    19504762 A1    8/1996
(Continued)

OTHER PUBLICATIONS

ISR of Swiss(CH) Patent Office in Priority Application No. CH01863/2009, dated Mar. 16, 2010.
(Continued)

*Primary Examiner* — James Harvey
(74) *Attorney, Agent, or Firm* — George Kapsalas; Patentbuero Paul Rosenich AG (57) ABSTRACT

A terminal (3*a* . . . 3*h*) for the electrical connection of a plurality of electrochemical cells (2) of a accumulator, which terminal comprises a U-shaped outer rail (4*a* . . . 4*f*) and an actuating element (5*a* . . . 5*g*), is described. According to the invention, the actuating element (5*a* . . . 5*g*) is coupled to a clamping element (6*a* . . . 6*f* . . . 6*h*) in such a way that the clamping element (6*a* . . . 6*f* . . . 6*h*) is pressed against at least one limb (4*a'* . . . 4*f'*) of the outer rail (4*a* . . . 4*f*) on actuation of the actuating element (5*a* . . . 5*g*).

23 Claims, 5 Drawing Sheets

(51) Int. Cl.
*H01M 2/26* (2006.01)
*H01M 10/04* (2006.01)

(56) References Cited

U.S. PATENT DOCUMENTS

| | | | |
|---|---|---|---|
| 2,997,688 A * | 8/1961 | Nielsen et al. | 439/797 |
| RE25,442 E | 9/1963 | Blanchet | |
| 3,599,071 A | 8/1971 | Lapuyade et al. | |
| 3,727,171 A * | 4/1973 | Coles et al. | 439/110 |
| 3,915,545 A * | 10/1975 | Saito | 439/724 |
| 4,214,120 A * | 7/1980 | Jones et al. | 174/536 |
| 4,517,263 A | 5/1985 | Reiss et al. | |
| 5,288,565 A | 2/1994 | Gruenstern | |
| 5,382,480 A | 1/1995 | Molyneux | |
| 5,456,994 A | 10/1995 | Mita | |
| 5,842,889 A | 12/1998 | Koellmann | |
| 5,952,815 A | 9/1999 | Rouillard et al. | |
| 6,010,800 A | 1/2000 | Stadnick et al. | |
| 6,040,525 A * | 3/2000 | Chauquet et al. | 174/40 CC |
| 6,413,668 B1 | 7/2002 | Sandberg et al. | |
| 6,423,441 B1 | 7/2002 | Ronning et al. | |
| 6,796,830 B2 | 9/2004 | Suess et al. | |
| 6,986,673 B2 * | 1/2006 | de la Borbolla | 439/100 |
| 7,094,496 B2 | 8/2006 | Rodriguez et al. | |
| 7,165,975 B2 * | 1/2007 | Hasegawa et al. | 439/66 |
| 7,608,360 B2 | 10/2009 | Wiepen | |
| 7,645,164 B1 * | 1/2010 | Ju | 439/591 |
| 2001/0007804 A1 * | 7/2001 | Wong | 439/811 |
| 2001/0026887 A1 | 10/2001 | Minamiura et al. | |
| 2002/0061427 A1 | 5/2002 | Vu et al. | |
| 2002/0177019 A1 | 11/2002 | Aoto et al. | |
| 2004/0028999 A1 | 2/2004 | Richard et al. | |
| 2004/0102096 A1 | 5/2004 | Lim | |
| 2004/0135550 A1 | 7/2004 | Nishihata et al. | |
| 2004/0161669 A1 | 8/2004 | Zolotnik et al. | |
| 2004/0163398 A1 | 8/2004 | Morishita et al. | |
| 2005/0106455 A1 | 5/2005 | Yoshida et al. | |
| 2005/0153200 A1 | 7/2005 | Wiepen | |
| 2005/0170241 A1 | 8/2005 | German et al. | |
| 2005/0269995 A1 | 12/2005 | Donnelly et al. | |
| 2006/0078786 A1 | 4/2006 | Wu | |
| 2006/0216582 A1 | 9/2006 | Lee et al. | |
| 2007/0248876 A1 | 10/2007 | Ahn et al. | |
| 2007/0285051 A1 | 12/2007 | Jeon et al. | |
| 2008/0003491 A1 | 1/2008 | Yahnker et al. | |
| 2008/0119066 A1 * | 5/2008 | Shimizu et al. | 439/76.1 |
| 2008/0124617 A1 | 5/2008 | Bjork | |
| 2008/0299449 A1 | 12/2008 | Yun et al. | |
| 2009/0090575 A1 | 4/2009 | Nagasaka | |
| 2009/0214940 A1 | 8/2009 | Haussmann | |
| 2010/0147488 A1 | 6/2010 | Pierre et al. | |
| 2010/0151307 A1 | 6/2010 | Naganuma | |
| 2011/0096485 A1 * | 4/2011 | Jian | 361/679.4 |
| 2012/0282820 A1 * | 11/2012 | Krause et al. | 439/762 |

FOREIGN PATENT DOCUMENTS

| | | |
|---|---|---|
| DE | 10101050 A1 | 7/2001 |
| DE | 10134143 A1 | 1/2003 |
| DE | 102004001876 B3 | 5/2005 |
| DE | 102004005394 A1 | 8/2005 |
| DE | 102005016042 A1 | 4/2006 |
| DE | 102005016534 A1 | 10/2006 |
| DE | 202008012441 U1 | 3/2009 |
| EP | 0199476 A2 | 10/1986 |
| EP | 0744784 A1 | 11/1996 |
| EP | 0940864 B1 | 7/2002 |
| EP | 1251589 A1 | 10/2002 |
| EP | 1447864 A1 | 8/2004 |
| EP | 1705743 A1 | 9/2006 |
| EP | 1944824 A2 | 7/2008 |
| FR | 2864712 A1 | 7/2005 |
| GB | 2077028 A | 12/1981 |
| JP | H06-283214 A | 10/1994 |
| JP | 2001-102099 A | 4/2001 |
| JP | 2004-253314 A | 9/2004 |
| JP | 2008-123769 A | 5/2008 |
| KR | 1020070059224 A | 6/2007 |
| WO | 03/071616 A2 | 8/2003 |
| WO | 03/094258 A2 | 11/2003 |
| WO | 2006/009062 A1 | 1/2006 |
| WO | 2007/102670 A1 | 9/2007 |
| WO | 2009/018941 A1 | 2/2009 |

OTHER PUBLICATIONS

International Search Report and International Preliminary Report on Patentability, dated May 23, 2011, from parent PCT/IB2010/055343; in English.

Copending related subject-matter U.S. Appl. No. 13/511,141, a National-phase of PCT/IB2010/055367; PCT filed Nov. 23, 2010.

* cited by examiner

TERMINAL FOR ACCUMULATOR CELLS

CROSS-REFERENCE TO RELATED APPLICATIONS

This application is a 35 U.S.C. 371 national-phase entry of PCT International application no. PCT/IB2010/055343 filed on Nov. 22, 2010 and also claims benefit of priority to Swiss national application no. CH-1863/09 filed on Dec. 4, 2009, and also claims priority as a non-provisional of U.S. provisional application Ser. No. 61/267,004 filed on Dec. 4, 2009; both Swiss national application no. CH-1863/09 and U.S. provisional application Ser. No. 61/267,004 are incorporated herein by reference in their respective entireties for all intents and purposes, as if identically set forth in full herein.

BACKGROUND

The invention relates to a terminal for the electrical connection of a plurality of electrochemical cells of an accumulator, comprising a U-shaped outer rail and an actuating element.

Today, electrical and electronic devices which may be operated independently of a power supply are increasingly being used. Powerful devices and the desire for a long operating time demand efficient accumulators. Of course, these should be compact and light but nevertheless have a high energy content. In particular, these requirements are applicable for electric vehicles. Battery- and accumulator-operated electric vehicles are no longer inconceivable today. While their existence had long been limited to niche applications, for example as fork-lift trucks and mine cars, the introduction of electric vehicles into road traffic in large numbers is now imminent.

A substantial point in the construction of accumulators is the interconnection of individual cells, since the required voltages (e.g. 400 volt and higher) and the required energy contents (e.g. 100 Ah and higher) cannot otherwise be achieved. Owing to the high currents, large conductor cross-sections are additionally required for the connection of the cells. The prior art discloses some solutions for this purpose.

US 2004/0102096 A1 discloses for this purpose, for example, an apparatus for connecting a plurality of prismatic cells, in which the connection lugs of the cells are inserted from below through an electrically insulating plate having suitable cut-outs. A counter-plate having metallic pins which fit into said cut-outs is pushed in from above. The cut-outs have a wedge-shape profile so that the connection lugs of the cells are contacted when the pins are pressed in.

DE 10134143A1 furthermore shows a rail-like cell connector having a U-profile. The connection lugs of the cells are soldered or welded to in each case one limb of the U-profile, so that series or parallel connection of the cells results.

Finally, DE 10 2004 001 876 B3 moreover discloses an arrangement of prismatic cells whose connection lugs are bent into a Z-shape so that the lugs of all cells rest flat against one another. With the aid of a (screw) terminal, the connection lugs are connected to one another.

Unfortunately, the known apparatuses have disadvantages. For example, the apparatus disclosed in US 2004/0102096 A1 is not very flexible because a separate terminal plate has to be produced for each type of connection. Moreover, in certain circumstances, manufacturing tolerances result in individual cells making only poor contact. The resulting high contact resistance in combination with very high currents (250 amps or more in the automotive sector) can lead to dangerous heating of the contact point and to damage thereof or even destruction. If the relevant contact point is touched with ignitable materials, this can moreover lead to a fire.

In the case of the solution disclosed in DE 101 34 143 A1, the cells are irreversibly connected. Repair or replacement of the cells is therefore not possible or is possible only with very great difficulty. Moreover, the soldering or welding of the cell vanes can lead to damage or even destruction of the cell during the production of the accumulator if, for example, the heat input "migrates" into the cell.

Finally, in the connection method presented in DE 10 2004 001 876 B3, connection lugs of different length are provided and are bent differently. This solution is therefore very inflexible.

SUMMARY

It is therefore an object of the invention to provide an improved terminal, in particular a terminal which permits flexible but nevertheless safe interconnection of cells.

According to the invention, this object is achieved by a terminal of the type mentioned at the outset, in which the actuating element is coupled to a clamping element in such a way that the clamping element is pressed against at least one limb of the outer rail on actuation of the actuating element.

According to the invention, a clamping element which is actuated via an actuating element is arranged between the limbs of the outer rail. On actuation, the clamping element or the clamping elements is or are pressed against the inside of the limbs of the outer rail. If connection lugs are now arranged between the limbs and the clamping elements, cells can be connected by actuating the actuating element. The connection of the cells is effected firstly securely, since (customary) manufacturing tolerances have only an insignificant effect on the function of the terminal, and secondly flexibly, since the cells can be connected arbitrarily to one another by individual terminals (different accumulator types can therefore be efficiently and economically produced), and thirdly reversibly, with the result that repairs to the accumulator are facilitated. Moreover, high currents can advantageously be conducted via the U-shaped outer rail. Finally, a connection of cells which are arranged in a stack is possible in a comparatively simple manner.

In the context of the invention, "vehicle" is moreover to be understood as meaning any motor-driven vehicle, i.e. land vehicles, including railway vehicles, water vehicles and aircraft.

Although the invention was and is explained in particular on the basis of an accumulator for an electric vehicle, the invention does of course also relate to accumulators for other purposes, in particular also for stationary installations and mobile devices. Advantageous configurations and further developments of the invention shall be evident from the remaining disclosure including the description in combination with the figures of the drawing.

It is advantageous if a cam arranged between the limbs of the outer rail is provided as a clamping element and an apparatus for rotating the cam is provided as an actuating element. In this variant of the invention, the terminal is actuated by rotating the cam, which is arranged in the U-shaped outer rail. For the actuation of the cam, all that is required is a rotation through a comparatively small angle of rotation, so that the clamping process and hence the production of an accumulator can advantageously be effected very rapidly.

It is furthermore advantageous if a resilient body arranged between the limbs of the outer rail is provided as a clamping element and a screw and a screw element provided with a threaded hole and cooperating with the screw is provided as an actuating element, which squeeze the resilient body on tightening. In this variant, a resilient body inserted into the U-shaped outer rail is squeezed vertically so that it broadens and thus clamps the cell connection lugs which are arranged between outer rail and resilient body. Advantageously, the resilient body can readily compensate manufacturing tolerances by its resilience. Conversely, this means that the terminal need not meet excessively high requirements with regard to the dimensional accuracy without having to dispense with a secure clamping effect. The terminal can therefore be produced in a technically simple manner and hence economically. If recesses are provided in the cell connection lug, the resilient body moreover "creeps" into said recesses on clamping, with the result that pulling away of the terminal by the additional interlocking connection is virtually ruled out.

It is furthermore advantageous if a screw and a screw element provided with a threaded hole and cooperating with the screw is provided as the actuating element and a body having a first interface which cooperates with a second interface of the screw head, of the screw element or of an element arranged between screw head and the screw element, in such a way that the clamping element is pressed against at least one limb of the outer rail on tightening of the screw, is provided as the clamping element, at least one of the two interfaces being inclined relative to the screw axis. In this variant of the invention, use is made of the wedge effect, for which there are a few possibilities. For example, two wedge strips forming the clamping elements can be arranged in the U-shaped outer rail, which wedge strips are forced apart by an actuating rail forming the screw element and are therefore pressed against the limbs of the outer rail. An advantage of this variant is that the clamping effect can be very exactly adjusted by the choice of a suitable angle of the V-elements. In addition, the clamping effect remains substantially constant over the entire operating time of the terminal, since it is not necessary here to provide a resilient body whose modulus of elasticity, dimensional stability etc., may change over time.

An advantageous clamp furthermore comprises clamping elements arranged on both sides of the screw and aligned along the outer rail. In this way, the same elements can be used for outer rails of different widths. The stock keeping for production and maintenance is therefore particularly easy.

It is advantageous if the cross-sections of the clamping elements are mirror images with respect to the screw axis. In this way, the same basic material (rod material) can be used for both clamping elements. The stock keeping for production and maintenance is therefore particularly easy.

It is furthermore advantageous if the cross-sections of the clamping elements are rotated relative to one another by 180° about an axis oriented along the outer rail. Substantially the same advantages result here as those which have already been mentioned for the previously mentioned variant.

An advantageous clamp comprises an elongated clamping element oriented along the outer rail and having a stationary central part and two clamping jaws which are connected thereto and face the limbs of the outer rail and which are forced apart on tightening of the screw and pressed against the limbs of the outer rail. This variant of the invention has the advantage that only one clamping element per terminal need be provided. Owing to the reduced number of individual parts and hence the simplified manipulation, the production of the terminal is particularly economical.

It is particularly advantageous if a U-shaped inner rail inserted into the outer rail is provided as the clamping element. The U-profiles provided both for the outer rail and for the inner rail are easy to produce or indeed are manufactured products. The terminal is therefore economical to produce. It is particularly economical if standard elements are also used for the screw element, for example trapezoidal, triangular or cylindrical prisms or rods, which are inserted into the inner rail.

It is advantageous if a plug, a bush or a clamping device is arranged on or in the outer rail. Frequently, the terminal is intended not only for the connection of cells but further units are connected thereto. For example, it is conceivable for the voltage of a terminal to be tapped for a control/monitoring circuit of the accumulator. This control/monitoring circuit can deduce the state of the cell from the individual cell voltages. If the voltage of a cell breaks down markedly, for example, an alarm signal can be output.

It is also advantageous if a temperature sensor is arranged on or in the outer rail. In this way, the cell temperature can be relatively easily monitored since the heat migrates from the interior of the cell to the outer rail via the electrical conductors, which in fact are as a rule also good heat conductors. By empirical experiments, it is also possible to determine which temperature on the outer rail corresponds to which cell (core) temperature. These data can be stored in a control/monitoring circuit of the accumulator and taken into account accordingly. Complicated equipping of cells with temperature sensors and the cabling thereof can therefore be dispensed with. Of course, a plug, a bush or a clamping device can be provided for the temperature sensor.

Finally, it is advantageous if the terminal has at least one cooling rib and/or one ventilation hole. The connection lugs of the cells, being good current conductors, are also good heat conductors and thus transport heat away from the interior of the cells or conduct heat to them. With the aid of the at least one cooling rib, this heat can be readily released to the surrounding air or taken from the latter. By means of the at least one ventilation hole, air can moreover pass through the terminal and reach the cells. The cells are therefore effectively thermostated. Of course, a plurality of cooling ribs and/or ventilation holes can be provided in order to reinforce the effect. Finally, the provision of at least one cooling rib and/or one ventilation hole, also independently of the other measures mentioned, can form the basis of an independent invention.

The above configurations and further developments of the invention can be combined in any desired manner.

BRIEF DESCRIPTION OF THE DRAWINGS

The present invention is explained in more detail below with reference to the working examples shown in the schematic figures of the drawing.

DETAILED DESCRIPTION

In the figures of the drawing, identical or similar parts are provided with identical reference numerals and functionally similar elements and features are—unless mentioned otherwise—provided with identical reference numerals but different indices.

Figure 1:
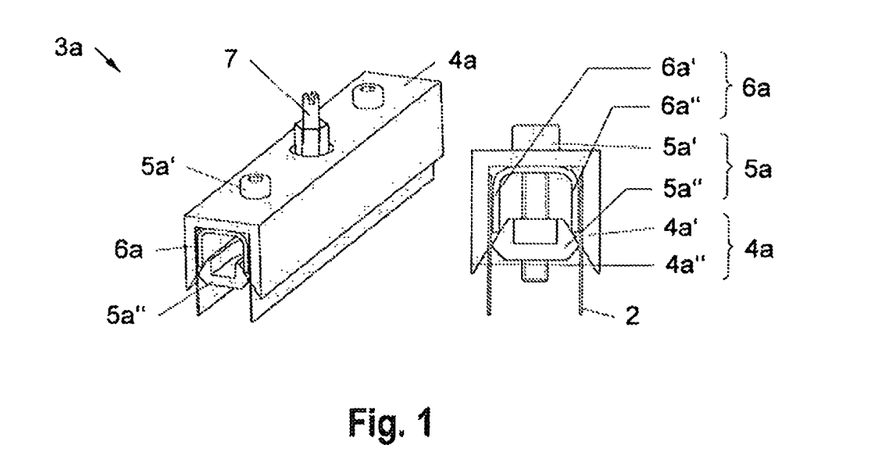
FIG. 1 shows a variant of a terminal according to the invention having a U-shaped inner rail.

FIG. 1 shows an advantageous possibility for connecting cells 1 of an accumulator. For this purpose, a terminal 3a (shown here in front view and oblique view) which comprises a generally U-shaped outer rail 4a and an actuating element 5a and a clamping element 6a is used. The actuating element 3a is coupled to the clamping element 6a in such a way that, on actuation of the actuating element 5a, the clamping element 6a is pressed against at least one limb 4a', 4a'' of the outer rail 4a.

In this specific example, a plurality of screws 5a' is provided as the actuating element 5a and an actuating rail 5a'' provided with corresponding internal threads and cooperating with the screws 5a' is provided as the screw element. A U-shaped inner rail inserted into the outer rail 4a is provided as the clamping element 6a.

The clamping element 6a therefore has a stationary central part and two clamping jaws 6a', 6a'' which are connected thereto and face the limbs of the outer rail and which are bent apart on tightening of the screw 5a' and pressed against the limbs of the outer rail. The clamping elements 6a', 6a'' are furthermore arranged on both sides of the screw 5a' and oriented along the outer rail 4a. In addition, the cross-section of the clamping element 6a has mirror-image symmetry with respect to the screw axis.

FIG. 1 also clearly shows that the U-shaped inner rail 6a has a first interface which cooperates with a second interface of the actuating rail 5a'' (screw element) in such a way that the clamping jaws 6a', 6a'' of the U-shaped inner rail 6a are pressed against the limbs 4a', 4a'' of the outer rail 4a on tightening of the screws 5a'. The second interfaces of the actuating rail 5a'' which cooperate with the clamping jaws 6a', 6a'' are inclined relative to the axes of the screws 5a'.

The connection lugs 2 of the cells 1 (the cells 1 are not shown in FIG. 1) are now arranged between the limbs 4a' and 4a'' of the outer rail 4a and the clamping jaws 6a' and 6a'' so that the cells 1 or the connection lugs 2 thereof are connected to one another on tightening of the screws 5a'. An auxiliary terminal 7 for the connection of a cable to the terminal 3a is provided on the outer rail 4a of the terminal 3a. For example, the cell voltage for a voltage monitoring circuit can be tapped here. In a preferred embodiment, the contacts used herein which are formed as connection lugs 2 of the galvanic cells 1 can also be coated with noble metal, especially silver-plated, for improving the electrical contact between the connection lugs 2 and the terminal 3a (and accordingly between the terminals shown in the following figures).

Figure 2:
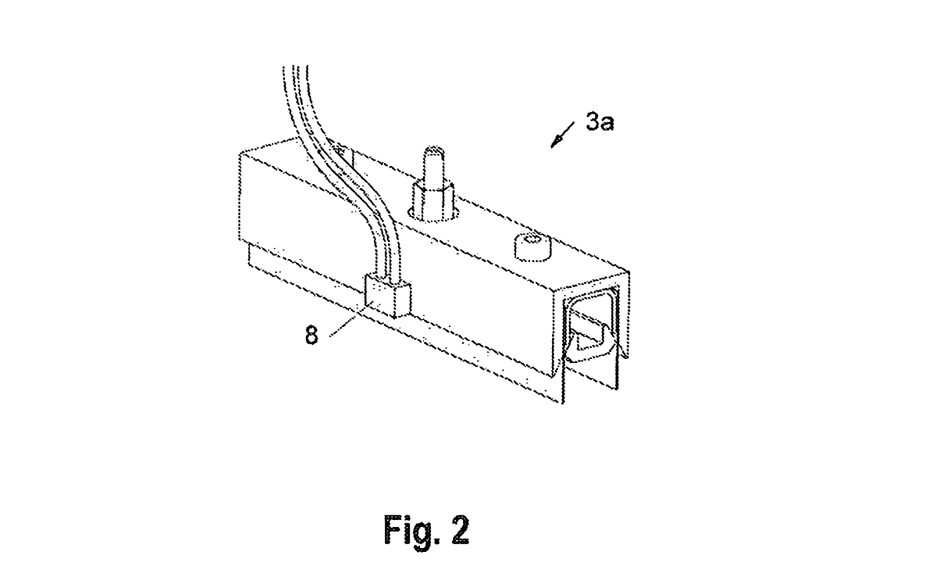
FIG. 2 shows the back of the terminal from FIG. 1 with a visible temperature sensor.

FIG. 2 shows the back of the terminal 3a shown in FIG. 1. As is evident, a temperature sensor 8 is arranged on or in the outer rail 4a. It is also conceivable for a plug or a bush to be provided for this purpose.

Figure 3:
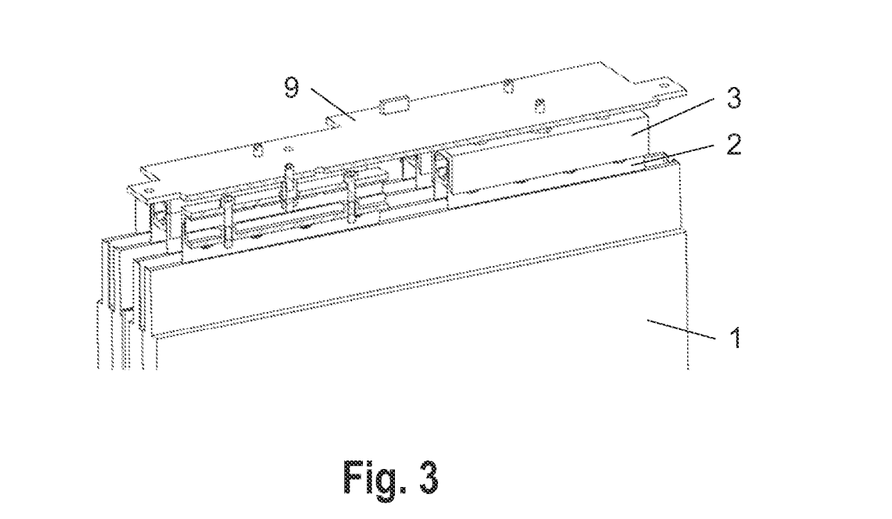
FIG. 3 shows a circuit board arranged over the terminals of a cell stack.

FIG. 3 shows an assembly comprising a plurality of cells 1 whose connection lugs 2 are connected to terminals 3 in order to achieve, for example, a series or parallel connection of the cells 1. A circuit board 9 on which an electronic circuit (not shown) for controlling and/or monitoring the accumulator 1 is arranged is deployed above the terminals 3. In this example, the terminals 3 comprise auxiliary terminals 7 (also see FIG. 1) which project through the circuit board 6. In this way, the terminals 3 can be contacted in a very simple manner with the circuit board 9 and hence with the circuit arranged thereon.

FIGS. 4 to 8 show further variants of the terminals 3b . . . 3f, in each case in a front view and oblique view.

Figure 4:
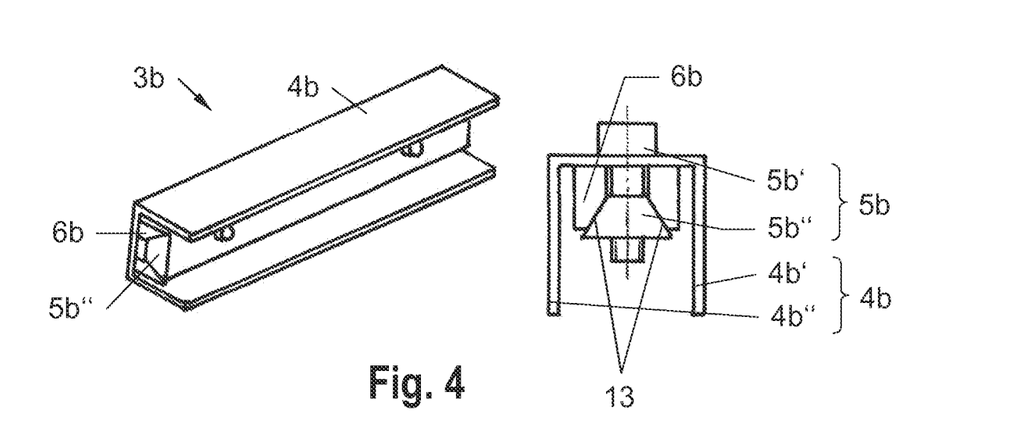
FIG. 4 shows a variant of a terminal according to the invention having two V-strips.

FIG. 4 shows a terminal 3b comprising a U-shaped outer rail 4b, an actuating element 5b and a clamping element 6b.

In this specific example, a plurality of screws 5b' is provided as the actuating element 5b and an actuating rail 5b'' provided with corresponding threaded holes and cooperating with the screws 5b' is provided as the screw element. Two V-strips 13 inserted into the outer rail 4b are provided as the clamping elements 6b.

The clamping elements 6b are elongated, arranged on both sides of the screws 5b' and oriented along the outer rail 4b. The cross-sections of the clamping elements 6b have mirror-image symmetry with respect to the screw axis.

The cooperation of the interfaces of the clamping elements 6b and of the actuating rail 5b'', which interfaces are inclined relative to the screw axis, is also clearly visible in FIG. 4. On tightening of the screws 5b', the actuating rail 5b'' is drawn upward and presses the clamping elements 6b against the limbs 4b', 4b'' of the outer rail 4b.

The connection lugs 2 of the cells 1 (connection lugs 2 and cells 1 not shown in FIG. 4) are arranged between the limbs 4b' and 4b'' of the outer rail 4b and the clamping jaws 6b' and 6b'' so that the cells 1 or the connection lugs 2 thereof are connected to one another on tightening of the screws 5b'.

Figure 5:
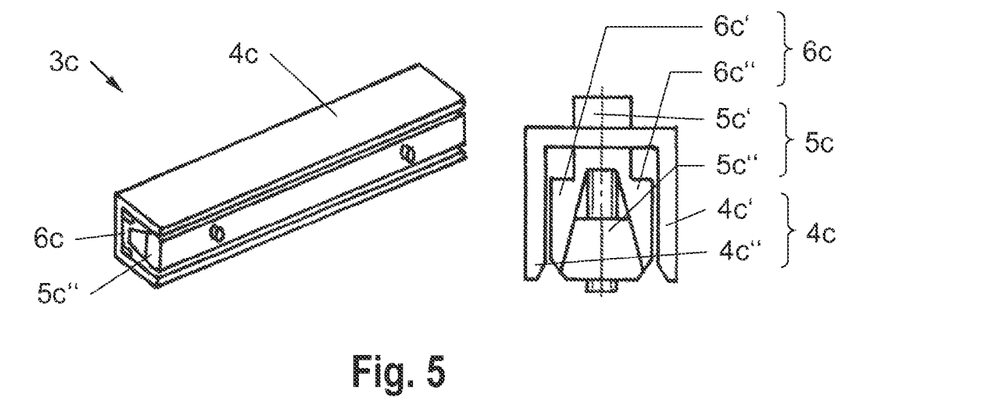
FIG. 5 shows a variant of a terminal according to the invention having a one-part clamping element.

FIG. 5 shows a variant of a terminal 3c which is functionally very similar to the terminal 3a shown in FIG. 1. Instead of the U-shaped inner rail 6a, however, a specially shaped inner rail 6c which is substantially distinguished in that the central part and the clamping jaws 6c' and 6c'' are comparatively thick and are connected to one another via a comparatively narrow connector is provided here. In addition, the clamping jaws 6c' and 6c'' have an interface which is inclined relative to the screw axis, which interfaces cooperate with an interface of the actuating rail 5c''.

Figure 6:
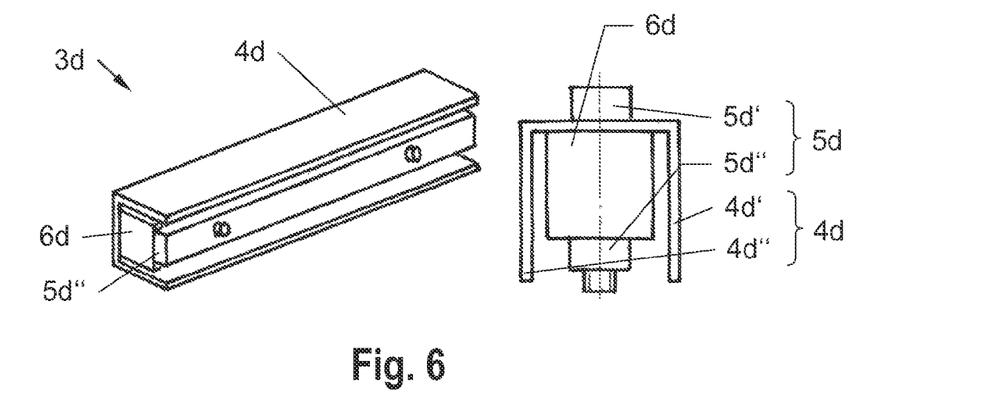
FIG. 6 shows a variant of a terminal according to the invention having a resilient clamping element.

FIG. 6 shows a terminal 3d in which a resilient body arranged between the limbs 4d' and 4d'' of the outer rail 4d is provided as the clamping element 6d and a screw 5d' and a screw element 5d'' provided with a threaded hole and cooperating with the screw 5d' is provided as the actuating element 5d. The screw element 5d'' is in the form of a flat strip having a plurality of threaded holes.

On tightening of the screws 5d', the flat strip 5d'' is bent upwards and deforms the resilient body 6d, whose height now decreases but whose width increases.

Once again, the connection lugs 2 of the cells 1 (connection lugs 2 and cells not shown in FIG. 6) are arranged between the limbs 4d' and 4d'' of the outer rail 4d and the resilient body 6d so that the cells 1 or the connection lugs 2 thereof are connected to one another on tightening of the screws 5d'. If holes are arranged in the connection lugs 2, the resilient body 6d moreover "creeps" into these holes on tightening of the screws 5d', resulting in additional interlocking.

Figure 7:
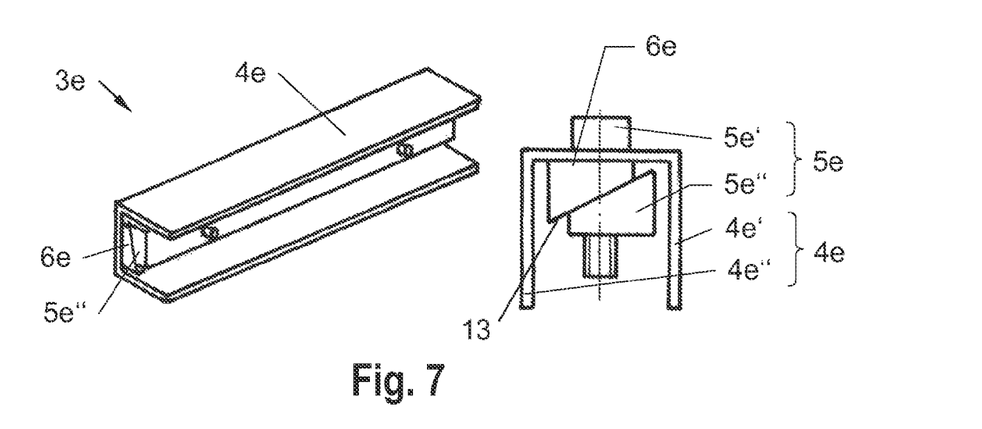
FIG. 7 shows a variant of a terminal according to the invention having two V-strips without separate actuating rails.

FIG. 7 shows a terminal 3e in which a plurality of screws 5e' is provided as the actuating element and an actuating rail 5e'' provided with corresponding threaded holes and cooperating with the screws 5e' is provided as the screw element. In this specific example, the actuating rail 5e'' moreover performs the function of a clamping element (this is therefore also designated below in some cases as clamping element 5e''). A V-strip 13 inserted into the outer rail 5e is provided by further clamping element 6e.

In this example, the cross-sections of the clamping elements 5e''', 6e are rotated relative to one another through 180° about an axis oriented along the outer rail 4e.

In FIG. 7, the cooperation of the interfaces of the clamping elements 5e''' and 6e, which are inclined relative to the screw axis, is also clearly evident. On tightening of the screws 5e', the clamping element 5e''' is drawn upward and cooperates thereby with the clamping element 6e so that both are pressed against the limbs 4e', 4e''' of the outer rail 4e. Slots for the screws 5e' are provided for this purpose in the outer rail 4e and in the clamping element 6e.

In an alternative embodiment, the clamping element 5e''' comprises no threaded holes but likewise slots. In addition, a flat strip that presses on both clamping elements 6 including V-strips is then provided as an actuating rail (similarly to FIG. 6). In this case, no slot need be provided for the screws 5e' in the outer rail 4e.

In both cases, once again the connection lugs 2 of the cells 1 (connection lugs 2 and cells not shown in FIG. 7) are arranged between the limbs 4e' and 4e''' of the outer rail 4e and the clamping jaws 6e' and 6e''', so that the cells 1 or the connection lugs 2 thereof are connected to one another on tightening of the screws 5e'.

Figure 8:
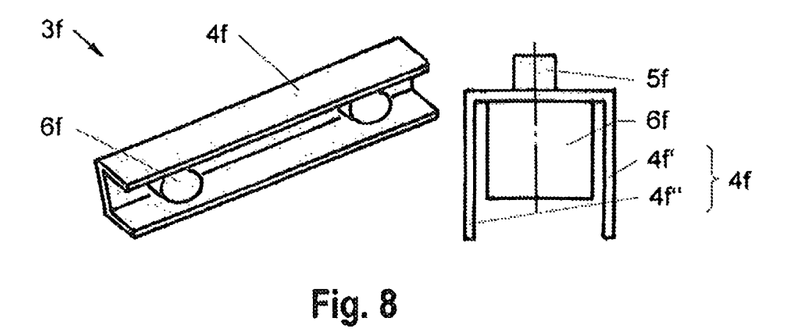
FIG. 8 shows a variant of a terminal according to the invention having eccentric clamping elements.

FIG. 8 shows a terminal 3f in which a cam arranged between the limbs 4f' and 4f''' of the outer rail 4f is provided as the clamping element 6f and a device for rotating the cam 6f is provided as the actuating element 5f. In the example shown, a screw head-like extension of the clamping element 6f is provided as the actuating element 5f. For example, a screw can be screwed into the cam 6f and then welded to it. Alternatively, a permanent bond can be produced with the aid of adhesive.

If the cam 6f is now rotated, its lateral surface is pressed against the limbs 4f', 4f''' of the outer rail 4f.

Once again, the connection lugs 2 of the cells 1 (connection lugs 2 and cells not shown in FIG. 8) are arranged between the limbs 4f' and 4f''' of the outer rail 4f and the cam 6f, so that the cells 1 or the connection lugs 2 thereof are connected to one another on actuation of the cam 6f.

The axis of the cams 6f may also be parallel to the outer rail 4f so that the actuation of the cams 6f can be effected via a laterally extended axle or laterally extended actuating element 5f on the end face of the rail 4f. For example, a plurality of cams 6f can thus be actuated together by an actuating element 5f. The laterally extended actuating element 5f may be advantageous if the outer surfaces of the rail 4f are not accessible or are covered, for example by a circuit board 9, as shown in FIG. 7.

In the case of the terminals 3b . . . 3d shown in FIGS. 4 to 7, prism-like actuating rails 5b . . . 5e extending over the total length of the outer rail 4b . . . 4e and clamping element 6b . . . 6e are always provided. Although this is advantageous because rod material which can be cut to any length can be used for this purpose, it is by no means essential. It is therefore also possible for said elements to extend only over a part of the outer rail 5b . . . 5e. Moreover, a multiplicity of such elements can be provided. Furthermore, said elements are not necessarily prismatic. It is also conceivable for them to be rotationally symmetrical about the axis of the respective coordinated screw 5b' . . . 5e'. For example, in FIG. 4, a plurality of nuts in the form of truncated cones can be provided instead of the actuating rail 5b . . . 5e. In a further alternative embodiment, a plurality of cylindrical, resilient bodies are provided instead of the individual prismatic, resilient body 6d from FIG. 6.

Furthermore, through-holes, instead of the threaded holes, can be provided in the actuating rail 5b . . . 5e. The actuation is then effected via (conventional) nuts.

In addition, the shape of the screw 5b' . . . 5e' should be regarded only as an example. Of course, other shapes can also be used. Moreover, the position of the screw head can be interchanged with the position of a nut so that the screw 5b' . . . 5e' is inserted from below through the outer rail 4b . . . 4e. In the case of the terminals 3a from FIGS. 1, 3b from FIGS. 4 and 3c from FIG. 5, it is also possible to provide a countersunk screw. The clamping effect can then be effected by the screw head in the form of a truncated cone. Finally, it is also possible to provide a threaded pin having a nut instead of a screw 5b' . . . 5e'.

Particularly for the terminals 3a from FIGS. 1, 3b from FIGS. 4 and 3c from FIG. 5, it is furthermore conceivable that the actuating rail 5a''', 5b''' and 5c''' is formed by a cylindrical prism whose longitudinal axis is oriented along the outer rail 4a, 4b and 4c, respectively. Simply as a result of the linear contact with the clamping elements 6a, 6b and 6c, the terminal 3a, 3b and 3c can in certain circumstances be actuated with application of less force.

This is the case in particular when the diameter of the cylindrical actuating rail 5a''' in the case of the terminal 3a from FIG. 1 is chosen so that the effective angle between inner rail 6a and actuating rail 5a''' in the end position is relatively shallow. Thus, the limbs 4a' and 4a''' are initially forced apart relatively rapidly but, because of the continuously decreasing effective clamping angle, due to the cylindrical shape, the movement of the limbs 4a' and 4a''' is continuously slowed down, but in favor of a greater wedge effect and hence reduced application of force. This variant of the terminal 3a is therefore particularly convenient to operate since it firstly clamps relatively rapidly and secondly also permits relatively high clamping forces.

Figure 9:
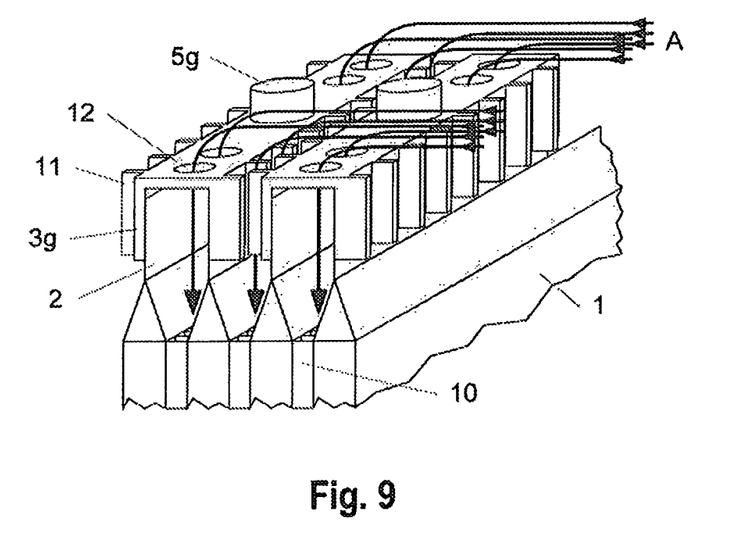
FIG. 9 shows a variant of a terminal according to the invention having cooling ribs and ventilation holes and FIG. 10 shows a terminal having two cams oriented along the outer rail and actuated together.

FIG. 9 shows a section from a further accumulator, namely a stack formed from electrochemical cells 1 with connector plates 10 which are located in between and through which air A for thermostating the cells 1 flows, in an oblique view. The connection lugs 2 are connected together with terminals 3g which are actuated by the actuating element 5g and which additionally have cooling ribs 11 and ventilation holes 12. The connection lugs 2, being good current conductors, are also good heat conductors and thus transport heat away from the interior of the cells 1 or conduct heat to them. With the aid of the cooling ribs 11, this heat can readily be released to the surrounding air or taken therefrom. Through the ventilation holes 12, air A can moreover pass through the terminal 3g and reach the connector plates 10 or cells 1. The cells 1 are thus effectively thermostated. Of course, said measures, i.e. the cooling ribs 11 and the ventilation holes 12, need not be used together but can also be provided individually. Of course, the cooling ribs 11 and/or the ventilation holes 12 can be provided on all designs of terminals and are also suitable in principle for terminals other than the terminals 3a . . . 3f shown in FIGS. 1 to 8. Thus, the cooling ribs 11 and/or the ventilation holes 12 can very generally form the basis of an independent invention for terminals for the electrical connection of the plurality of electrochemical cells of an accumulator.

Figure 10:
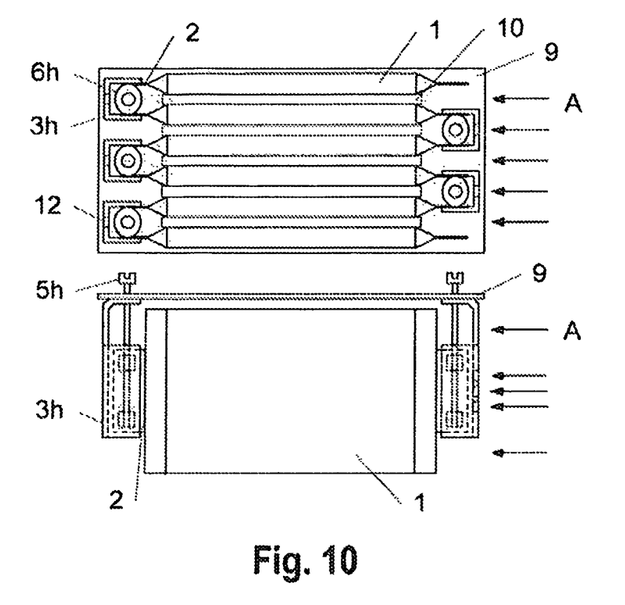

FIG. 10 shows a section from a further accumulator, namely a stack formed from electrochemicals cells 1 and having connector plates 10 which are located in between and through which once again air A flows for thermostating the cells 1, in plan view and front view. As can easily be seen, the terminals 3h for connecting together the connection lugs 2 are not present only on one side of the stack but on both sides thereof. In this way, cells 1 which have connection lugs 2 on a plurality of sides can be connected. A circuit board 9 is arranged above the cell stack (shown here in transparent form and without electronic components). For example, the circuit board 9 may have a circuit for monitoring the accumulator. The terminals 3h are mounted on the bottom of the circuit board 9, via brackets. In each case two clamping elements 6h (in this case cams) whose axis is oriented along a terminal 3h are actuated via an actuating element 5h and thus clamp the connection lugs 2. Once again, ventilation holes 12 for permitting the passage of air A are arranged in the terminals 3h.

In the context of the foregoing description and the appended claims, it should be understood that the terms "connected" and "connection" are used in an operational sense and are not necessarily limited to a direct physical connection or coupling. Thus, for example, two devices may be connected directly, or via one or more intermediary structures or devices. As another example, devices may be connected in such a way that energy or information can be passed therebetween, while not sharing any physical connection one with another. Based on the disclosure provided herein, one of ordinary skill in the art will appreciate a variety of ways in which connection exists in accordance with the forementioned definition.

Finally, it is noted that the variants shown represent only a selection from the many possibilities for an accumulator 1a, 1b according to the invention and must not be used for limiting the range of application of the invention. For the person skilled in the art, it should be easy to adapt the invention to its needs on the basis of the considerations described here, without departing from the scope of protection of the invention. In addition, it is pointed out that parts of the devices shown in the figures may also form the basis for independent inventions.

LIST OF REFERENCE LABELS

A Air
1 Electrochemical cell
2 Connection lug
3a . . . 3h Terminal
4a . . . 4f Outer rail
5a . . . 5g Actuating element
5a' . . . 5e' Screw
5a" . . . 5e" Actuating rail
6a . . . 6f, 6h Clamping element
6a', 6a" Clamping jaws
6c', 6c" Clamping jaws
7 Auxiliary terminal
8 Temperature sensor
9 Circuit board
10 Connector plate
11 Cooling rib
12 Ventilation hole
13 V-strip

What is claimed is:

1. An electrical connector terminal comprising:
    a generally U-shaped outer rail;
    said outer rail having a first limb;
    said first limb having a first inner surface;
    said outer rail having a second limb;
    said second limb having a second inner surface facing said first inner surface;
    said outer rail having a base connected between said first and second limbs;
    an actuator extending through said base into a space between said first inner surface and said second inner surface; and,
    a clamping member configured to selectively exert clamping pressure against at least one of said first and second inner surfaces in a direction substantially parallel to said base of said outer rail when selectively activated by said actuator, said clamping member being operatively connected to said actuator and having location in said space between said first inner surface and said second inner surface.

2. An electrical connector terminal as claimed in claim 1, further comprising:
    said clamping member includes a cam; and,
    said actuator is operatively connected to said cam to rotate it.

3. An electrical connector terminal as claimed in claim 2, further comprising:
    a second clamping member having location in said space between said first inner surface and said second inner surface, said second clamping member includes a second cam.

4. An electrical connector terminal as claimed in claim 1, further comprising:
    said clamping member includes a generally U-shaped inner rail;
    said inner rail having an inner rail first limb;
    said inner rail first limb having an inner rail first limb inner surface;
    said inner rail first limb having an inner rail first limb outer surface;
    said inner rail having an inner rail second limb;
    said inner rail second limb having an inner rail second limb inner surface;
    said inner rail second limb having an inner rail second limb outer surface;
    said inner rail having an inner rail base connected between said inner rail first limb and said inner rail second limb; and,
    said inner rail base has an inner rail base inner surface, and said inner rail base has an inner rail base outer surface.

5. An electrical connector terminal as claimed in claim 4, further comprising:
    said actuator includes a plurality of actuating screws extending through said outer rail base.

6. An electrical connector terminal as claimed in claim 5, further comprising:
    an actuating rail configured to selectively exert clamping pressure on said inner rail first and second limbs, said actuating rail having location in said space between said first inner surface and said second inner surface.

7. An electrical connector terminal as claimed in claim 6, further comprising:
    said actuating screws are operatively connected to said actuating rail; and,
    said actuating rail contacts said inner rail first limb inner surface and said inner rail second limb inner surface.

8. An electrical connector terminal as claimed in claim 5, further comprising:
    said inner rail base outer surface has a central step portion, said central step portion forming a thicker wall;
    said central step portion being connected to said inner rail first limb by a first comparatively narrow connection portion, and said central step portion being connected to said inner rail second limb by a second comparatively narrow connection portion;
    said inner rail first and second limb inner surfaces being inclined relative to the axes of said actuating screws; and, said actuating screws each extending, respectively, into respective bores in said central step portion thicker wall.

9. An electrical connector terminal as claimed in claim 8, further comprising:
an actuating rail configured to selectively exert clamping pressure on said inner rail first and second limbs; and,
said actuating screws are operatively connected to said actuating rail.

10. An electrical connector terminal as claimed in claim 1, further comprising:
said actuator includes a plurality of actuating screws extending through said outer rail base.

11. An electrical connector terminal as claimed in claim 10, further comprising:
said clamping member includes a first V-strip; and,
said clamping member includes a second V-strip.

12. An electrical connector terminal as claimed in claim 11, further comprising:
said first V-strip is a first rail with first trapezoidal cross-section; and,
said second V-strip is a second rail with second trapezoidal cross-section.

13. The electrical connector terminal as claimed in claim 12, wherein:
said first trapezoidal cross-section has one of its legs perpendicular to both its bases and has its longer base facing said first inner surface; and,
said second trapezoidal cross-section has one of its legs perpendicular to both its bases and has its longer base facing said second inner surface.

14. The electrical connector terminal as claimed in claim 12, wherein:
said first trapezoidal cross-section has its shorter leg perpendicular to both its bases;
said second trapezoidal cross-section has its shorter leg perpendicular to both its bases; and,
the respective longer legs of each of said first and second trapezoidal cross-sections, respectively, are in mutual contact.

15. An electrical connector terminal as claimed in claim 11, further comprising:
an actuating rail configured to selectively exert clamping pressure biasing said first V-strip towards said first limb inner surface and biasing said second V-strip towards said second limb inner surface; and,
said actuating screws are operatively connected to said actuating rail.

16. An electrical connector terminal as claimed in claim 10, further comprising:
said clamping member includes a V-strip having the form of a rail with trapezoidal cross-section.

17. An electrical connector terminal as claimed in claim 10, further comprising:
said clamping member has a resilient body in said space between said first inner surface and said second inner surface.

18. An electrical connector terminal as claimed in claim 17, further comprising:
said clamping member has a strip configured to compress said resilient body towards said outer rail base.

19. An electrical connector terminal as claimed in claim 1, further comprising:
a temperature sensor operatively connected to said outer rail.

20. An electrical connector terminal as claimed in claim 1, further comprising:
a cooling fin on said outer rail.

21. An electrical connector terminal as claimed in claim 1, further comprising:
a ventilation hole in said outer rail.

22. An electrical connector terminal as claimed in claim 1, further comprising:
at least one of a plug, a bush, or an auxiliary terminal arranged on said outer rail.

23. An electrical connector terminal comprising:
a generally U-shaped outer rail;
said outer rail having a first limb;
said first limb having a first inner surface;
said outer rail having a second limb;
said second limb having a second inner surface facing said first inner surface;
said outer rail having a base connected between said first and second limbs;
an actuator extending parallel to said base into a space between said first inner surface and said second inner surface;
a clamping member configured to selectively exert clamping pressure against at least one of said first and second inner surfaces when selectively activated by said actuator, said clamping member being operatively connected to said actuator and having location in said space between said first inner surface and said second inner surface;
said clamping member includes a cam; and,
said actuator is operatively connected to said cam to rotate it.

\* \* \* \* \*